Patented Mar. 11, 1930

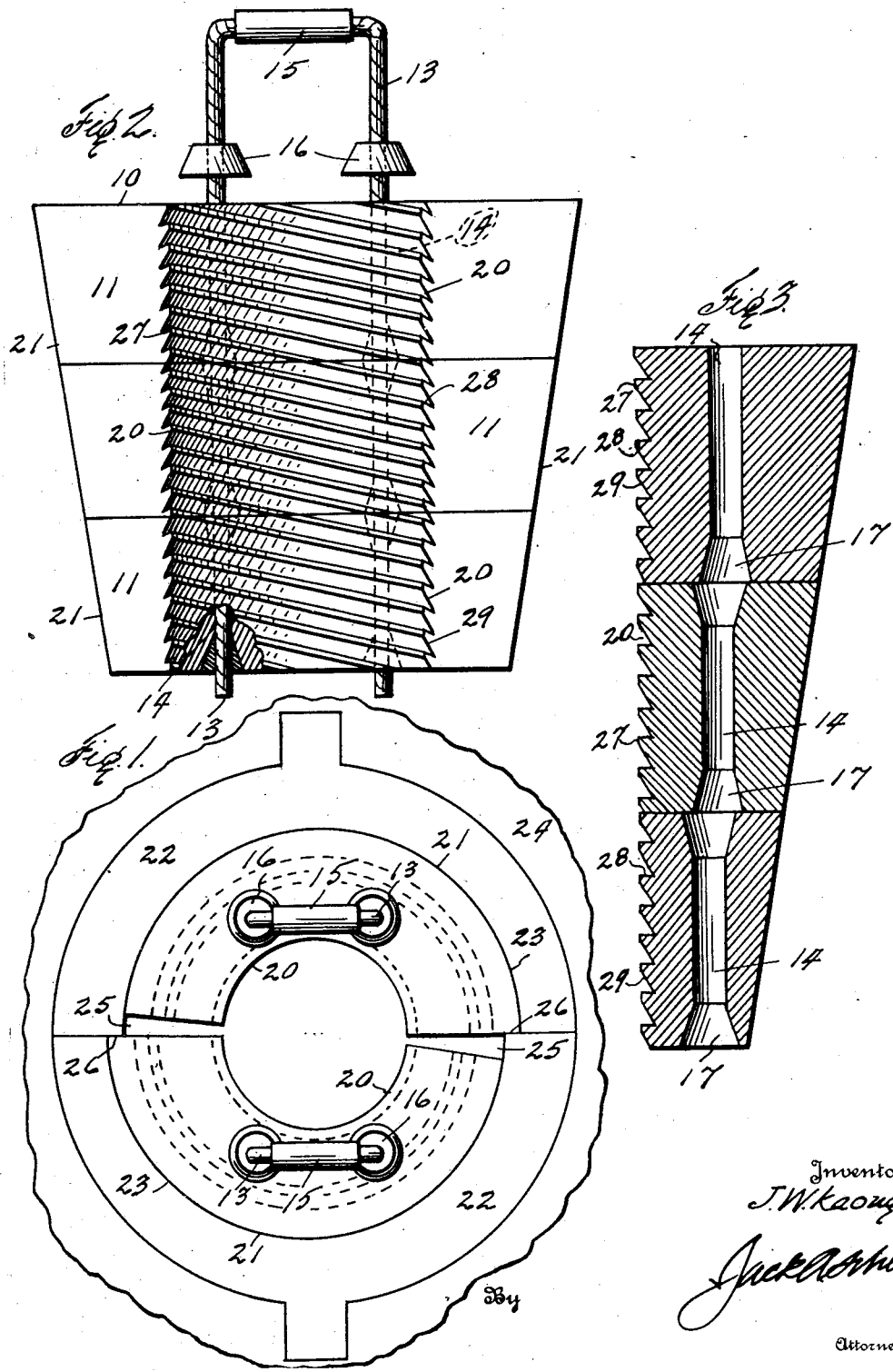

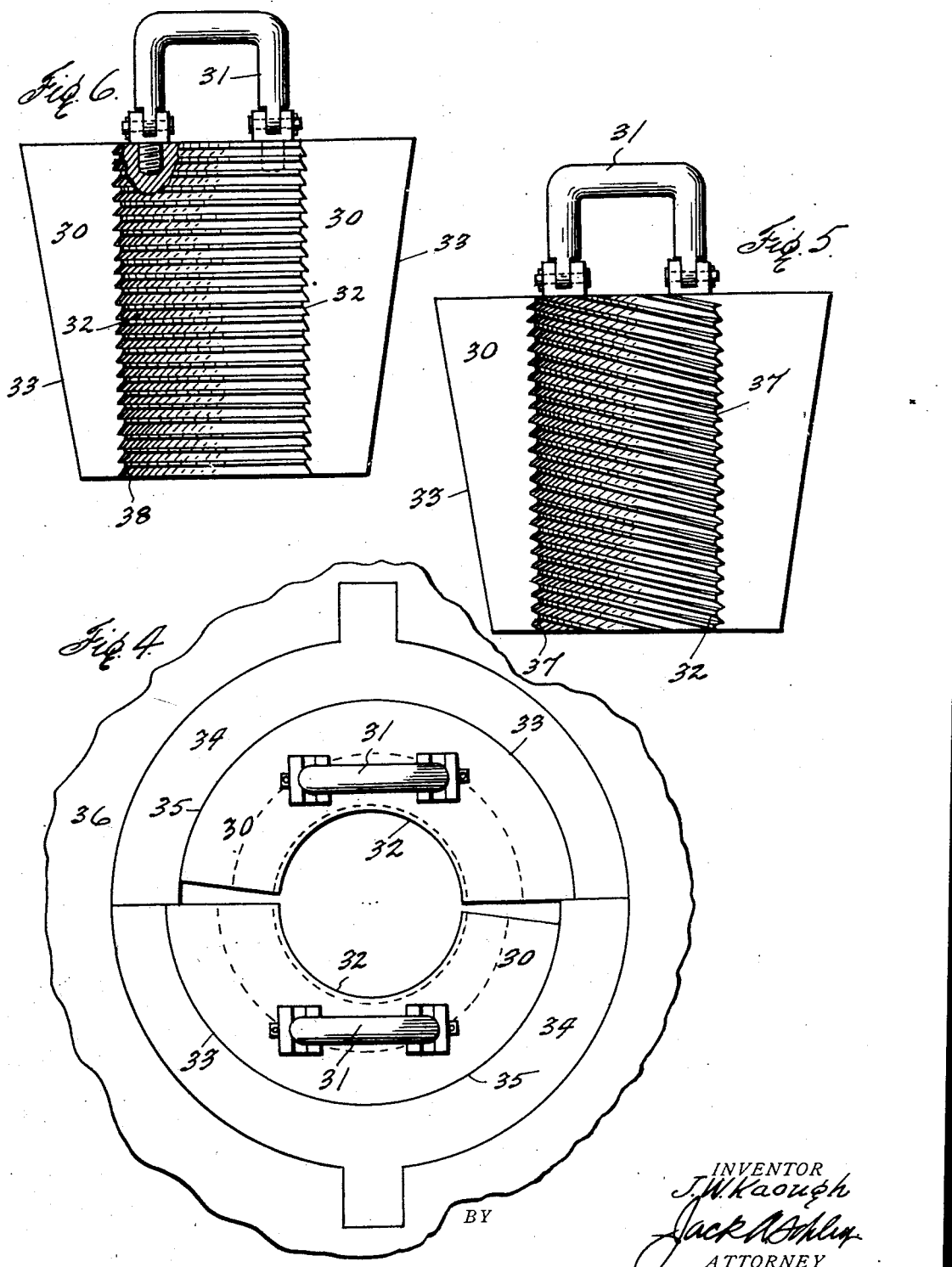

1,749,946

UNITED STATES PATENT OFFICE

JOSEPH W. KAOUGH, OF NEAR HOUSTON, TEXAS

WEDGE SLIP FOR ROTARIES

Application filed June 7, 1928. Serial No. 283,591.

This invention relates to a wedge slip for rotaries, and particularly to a construction by which the wedging action of the slip is supplemented by a pressure of the bushing thereon to effect sufficient grip upon a pipe to enable a string thereof to be connected or disconnected at the coupled joints.

The ordinary wedge slip is designed to support the pipe or rod against downward movement and if used in connection with a rotary there is liable to be a circumferential movement of the slip upon the pipe which particularly defeats the proper holding of the pipe for breaking out or unscrewing the pipe sections. It is also desirable to avoid any tilting or rocking of the slip upon the pipe which would cause an edge of the slip to bite or cut into the pipe, so that it becomes important that the entire gripping face of the slip should be constantly held in contact with the pipe.

To avoid the objections just noted and provide a more efficient construction this invention presents a form of slip wherein the gripping face is concentric to the axis of the slip and the outer wedging face is eccentric to the gripping face and fitted into contact with a corresponding eccentric face upon the enclosing bushing which is actuated by the rotary. The invention also contemplates the use of slanting or spiral teeth upon the gripping face of the slip which assist in effecting firm engagement in the rotary action of the bushing.

A further object of the invention is to apply this eccentric mounting to a slip section formed of a plurality of superposed segments mounted for longitudinal movement upon a connector and for a lateral movement in the bending of such connector.

Another object of the invention is to provide the gripping face of the slip with teeth disposed diagonally to the axis of the slip and having flattened faces which prevent injury to the pipe, but owing to their inclination, secure at their edges a screw thread like engagement therewith under the action of the rotated bushing or pipe.

Other and further objects and advantages of the invention will be hereinafter set forth and the novel features thereof defined by the appended claims.

In the drawings—

Figure 1 is a top plan of the assembled slips;

Figure 2 is an elevation of one slip section;

Figure 3 is an enlarged section through slip segments;

Figure 4 is a plan of a modified form of the invention;

Figure 5 is an elevation of the slip used therein; and

Figure 6 is a similar view of a further modified form of slip.

Like numerals of reference indicate like parts in the several figures of the drawings.

In the preferred form of the invention shown in Figures 1, 2 and 3 the slip sections 10 are composed of a plurality of superposed segments 11 mounted upon connectors 13 extending through apertures 14 in the segments. These connectors are joined at the handle 15 and provided with stops 16 to prevent the segments engaging the handle when the slip is not in use.

The lowermost segment is secured to the connector and the uppermost segments are movable longitudinally thereon. The apertures 14 are flared or enlarged at their ends 17 and the connector is bendable laterally and fits the apertures so that the segments will shift laterally with the cable, while the flared ends prevent shearing wear thereon. When the segments are set in operative position the apertures are out of direct alinement, but when removed from their bushing and suspended by the connector cable it will straighten and shift the segments laterally to insure their introduction into the bushing without engagement with the upper edge thereof.

The beforementioned parts are not claimed in this application as they form the subject of my copending application filed June 7, 1928, Serial No. 283,590.

The invention provides for an eccentric action upon the slips transverse of their wedging movement in a substantially vertical plane, and for this purpose each slip is formed with its inner gripping face 20 concentric to the axis of the assembled slips while the outer wedging face 21 of the slip is eccentric to the gripping face, as shown in Figure 1. The bushing 22 surrounds the slips and has an inner eccentric face 23 corresponding to the eccentric face upon the slip and disposed to maintain substantially continuous contact with the eccentric faces of the slips to avoid any tilting action of the slips upon the pipe. The bushing is carried by the usual rotary, indicated at 24, by which motion is imparted thereto.

It will be observed that the slip sections 10 are spaced from each other at their adjacent ends, as at 25, to permit a limited movement in one direction, generally counter clockwise, and movement of the slips in an opposite direction is prevented by end walls 26 of the bushing sections.

The gripping faces of the segments forming the slip are formed with teeth spirally disposed or inclined at an angle to the vertical and these teeth are formed with flat faces 27 to prevent cutting the pipe, horizontal faces 28 to give the tooth depth, and connecting bevelled faces 29 connecting the faces 27 and 28. In the event of any rotary slipping of the wedge members the inclination of the teeth effects firm engagement with the pipe and a screw-thread like action thereon to secure the pipe within the slips.

In the modifications shown in Figures 4, 5 and 6 the slips 30 are each formed as a solid unit, as distinguished from the movable segments shown in Figures 1, 2 and 3. This slip is provided with the usual pivoted handle 31 and its inner gripping face 32 is disposed concentric to the axis of the assembled slips, while its outer wedging face 33 is eccentric to said axis and to the face 32, as before described. The bushing 34 is provided with an inner eccentric face 35 corresponding to that of the slip, and the bushing is supported in the rotary 36 in the usual manner. In Figure 5 the gripping face of the slip is shown as provided with spirally arranged teeth 37, such as described in connection with Figure 3. In Figure 6 the teeth 38 are disposed in parallel horizontal planes in the customary manner, but otherwise this form is provided with the concentric and eccentric faces on the slip as explained in connection with Figure 4.

The general operation of the invention will be apparent from the foregoing description from which it will be seen that in the clockwise movement of the rotary the resistance offered by the pipe is anti-clock-wise, and therefore any slipping movement of the slips would be in the latter direction and the eccentric action tends to tighten the slips. The grip of the slips is also facilitated by the slant of the teeth which is usually downward toward the right as greater force is necessary for breaking-out the pipe joints than for connecting the same. In screwing up a string of pipe an ordinary connection is made and the tightening effected during subsequent drilling, so that it is not necessary to provide the teeth on the opposite slip with a left hand downward slant. The invention presents a simple, very efficient, and economically manufactured construction of wedge slip particularly adapted for rotaries, and one in which there is a cooperative action between the eccentric mounting and the slip formed of assembled segments capable of vertical and horizontal movements relative to each other.

The specific construction of the invention has been shown and described but the invention is not confined thereto as changes and alterations may be made therein without departing from the spirit of the invention as recited in the following claims.

What I claim is—

1. In a wedge slip device for rotaries, a slip member having a gripping face concentric to the axis of the slip and an outer wedge face formed eccentric to said gripping face, an enclosing member having an eccentric face corresponding to the eccentric face upon the slip and means for imparting rotary movement to said member to shift the same upon the outer slip face.

2. In a wedge slip device for rotaries, a plurality of superimposed slip sections, each having a gripping face concentric with the axis of the device and an outer wedge face formed eccentric to the corresponding gripping face, and an enclosing member having an eccentric face engaging the eccentric faces of said sections, said sections being mounted for limited circumferential movement upon said enclosing member relative to each other.

3. In a wedge slip device for rotaries, a plurality of superimposed slip sections, each having a gripping face concentric with the axis of the device and an outer wedge face formed eccentric to the corresponding gripping face, and a bushing surrounding said sections and having separate inner eccentric faces to continuously contact with the eccentric faces of the slip sections.

4. In a wedge slip device for rotaries, opposite slip members each having a gripping face concentric to the axis of the device and an outer eccentric wedging face formed by the circumferentially increasing thickness of the member, and a bushing having opposite eccentric faces continuously engaging the eccentric faces of the members and being of greater circumferential length to permit limited movement thereon in one direction.

5. In a wedge slip device for rotaries, opposite slip members each having a gripping face concentric to the axis of the device and an outer eccentric wedging face formed by the circumferentially increasing thickness of the member, and a bushing having opposite eccentric faces continuously engaging the eccentric faces of the members and being of greater circumferential length to permit limited movement thereon in one direction, said bushing being formed with abutments to limit a rotative movement in an opposite direction.

6. A wedge slip device for rotaries comprising a plurality of superimposed slip segments each having an inner gripping face concentric to the axis of the device and an outer wedging face eccentric to the corresponding gripping face, a bushing having an eccentric face engaging the corresponding faces of the segments, and a connector for the segments upon which they are mounted for axial movement independent of each other.

7. A wedge slip device as defined by claim 6 in which the connector is laterally bendable to permit horizontal shifting of the superimposed segments upon each other.

8. A wedge slip device for a rotary comprising a plurality of segments each having an inner gripping face formed with spirally disposed teeth to effect threaded engagement with an object and an outer wedge face disposed eccentric to the axis of the device, and a rotative bushing having an eccentric inner face continuously engaging the eccentric faces of the segments.

In testimony whereof I affix my signature.

JOSEPH W. KAOUGH.